United States Patent [19]

Krzak

[11] 4,357,860
[45] Nov. 9, 1982

[54] TELESCOPING CONDUIT FOR PRESSURIZED AIR

[75] Inventor: David W. Krzak, Belmont, Calif.

[73] Assignee: McCormick-Morgan, Inc., San Francisco, Calif.

[21] Appl. No.: 200,810

[22] Filed: Oct. 27, 1980

[51] Int. Cl.³ ............................................. F24F 7/007
[52] U.S. Cl. .................................. 98/33 R; 138/120; 138/155; 285/302
[58] Field of Search .................... 98/32, 33 R, 37, 39, 98/40 C, DIG. 7; 138/107, 120, 155; 248/354 R; 285/302; 137/615, 580

[56] References Cited

U.S. PATENT DOCUMENTS

| 1,824,422 | 9/1931 | Badger | 285/302 |
| 1,987,372 | 1/1935 | Schellhammer | 285/302 |
| 2,402,157 | 6/1946 | Griswold | 285/302 X |
| 2,614,887 | 10/1952 | Shields | 285/302 X |
| 3,399,545 | 9/1968 | Anderson et al. | 98/33 R X |
| 3,399,548 | 9/1968 | Burns | 285/302 X |
| 4,077,592 | 3/1978 | Forbes | 138/107 X |

FOREIGN PATENT DOCUMENTS 651372  3/1951  United Kingdom ............... 285/302

Primary Examiner—Albert J. Makay
Assistant Examiner—Harold Joyce
Attorney, Agent, or Firm—Townsend and Townsend

[57] ABSTRACT

A telescoping conduit for directing air at moderate pressures to a waiting aircraft along a telescoping bridge is disclosed. One telescoping tube is suspended from each segment of the telescoping bridge. The tubes are coaxially supported from the bridge by adjustable brackets. A tube at one end of the bridge is suspended from its bridge segment at both ends of the tube, while the remainder of the tubes are suspended from a single end. This allows the tubes to fully telescopically extend and retract while providing support for the tubes at each end. A sealing portion at one end of the tubes is somewhat flexible to accommodate slight misalignment of the tubes. Also disclosed is a roller cage for centering the nesting tubes so that a wiper seal between the nesting tubes is not damaged.

14 Claims, 6 Drawing Figures

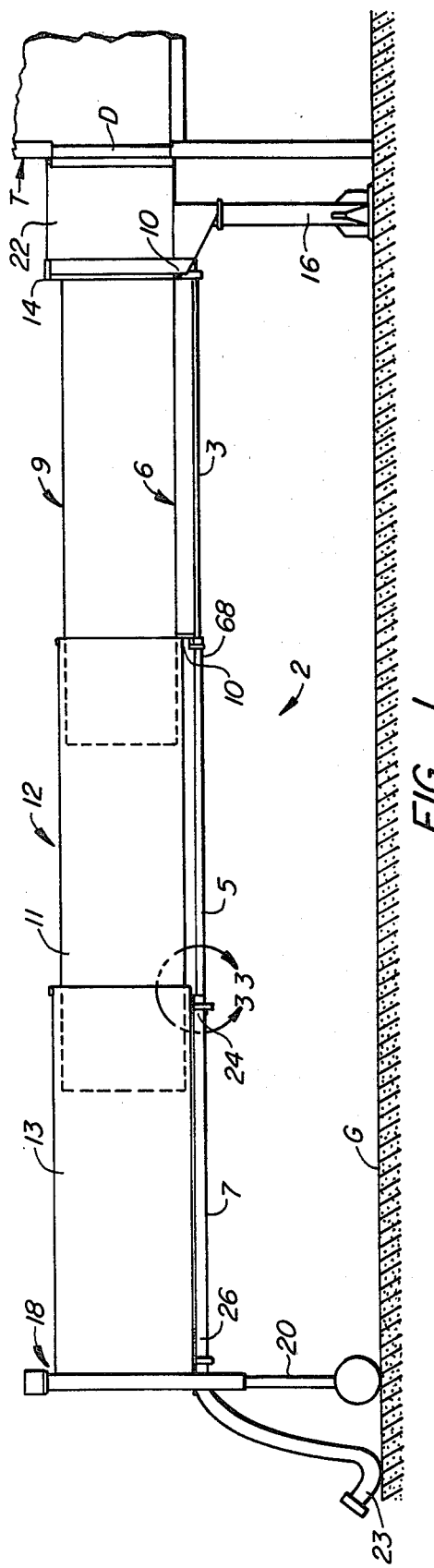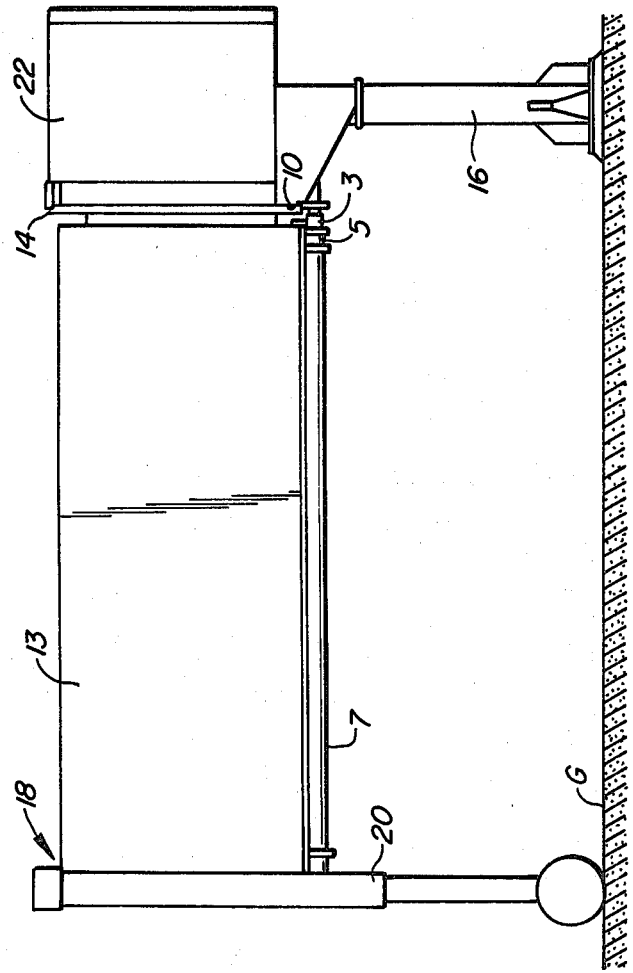

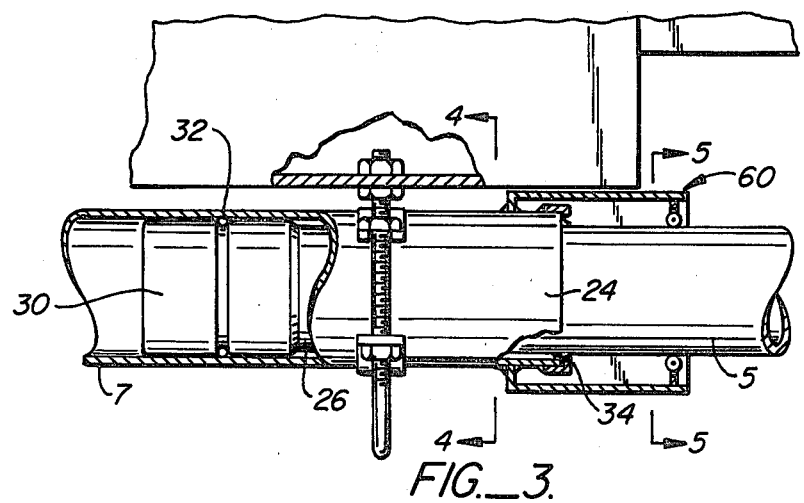
FIG._3.
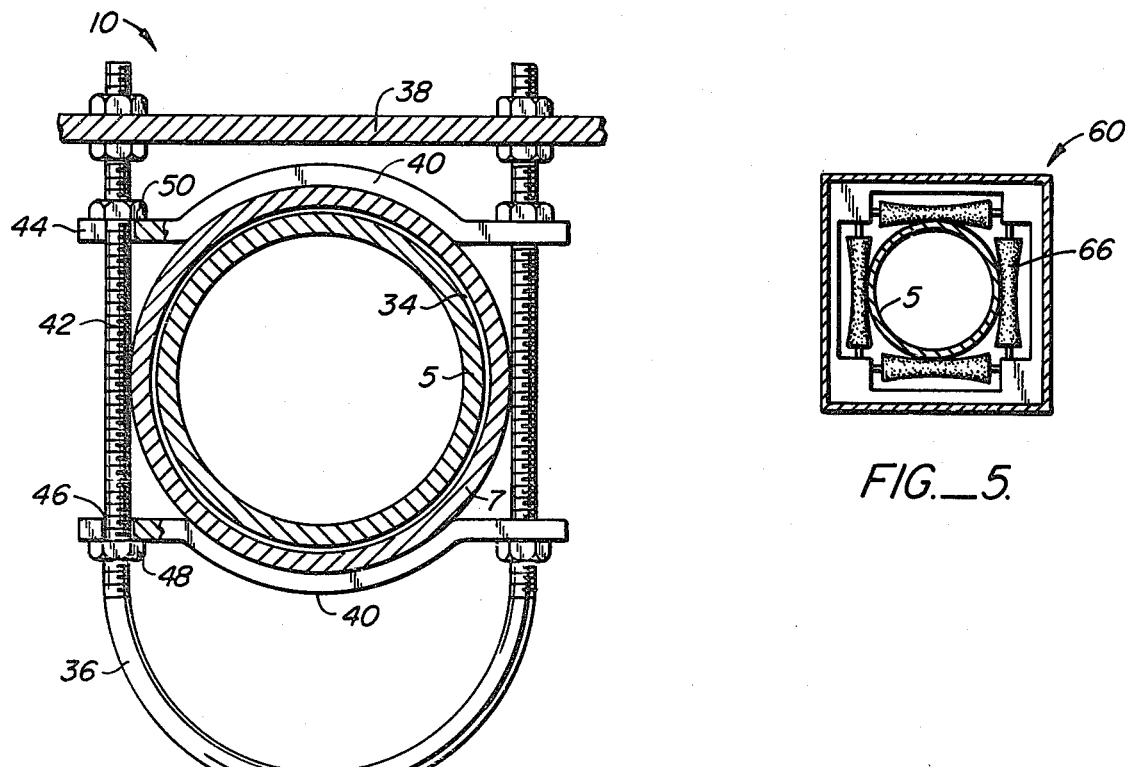
FIG._4.
FIG._5.
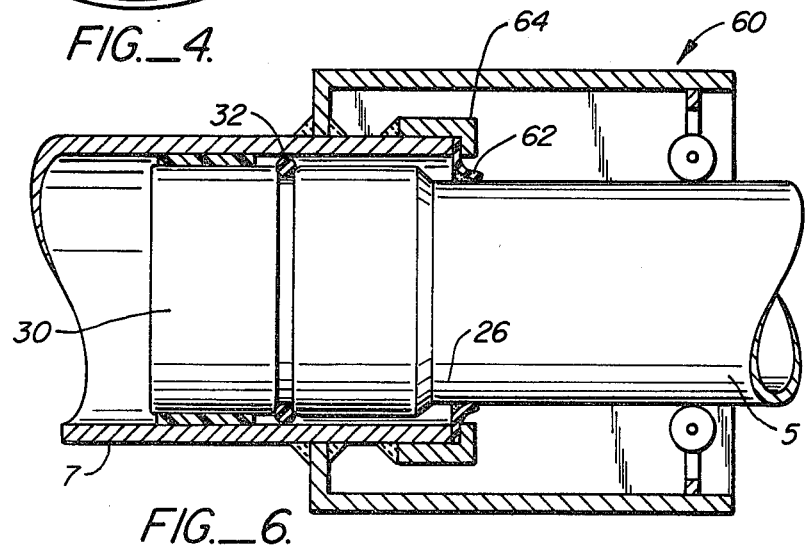
FIG._6.

TELESCOPING CONDUIT FOR PRESSURIZED AIR

BACKGROUND OF THE INVENTION

At most relatively large airports it has become common for passengers to be boarded onto and off-board from the waiting aircraft via a telescoping bridge. One end of the telescoping bridge is situated at the doorway of the waiting area in the terminal. When the aircraft is in position near the terminal area, the outer end of the telescoping bridge, typically supported by a wheeled support structure, is moved into position adjacent the door of the waiting aircraft.

Aircraft are equipped with an auxiliary power unit, or APU, to provide power for the aircraft while it is on the ground and the engines are not operating. The APU powers the on-board air conditioning unit and supplies power for starting its engines. However, the APU is a relatively inefficient power source so that an alternative, off-board, source for powering the on-board air conditioning unit, and also for starting up the jet engines, is desirable. Further, operating the APU adds to the relatively high level of air and noise pollution at the airport.

The use of telescoping bridges for passage of passengers between the aircraft and the terminal provides a vehicle by which servicing lines, such as electric cables, can be carried to the waiting aircraft. In U.S. Pat. No. 3,399,545 an expandable duct is disclosed for carrying preconditioned air to waiting aircraft. The preconditioned air is then fed directly to the aircraft so that the APU is not needed to either heat or cool the aircraft interior. The duct is preferably of a commercially available type in which a spiral wire is covered with a flexible plastic covering. The use of this longitudinally flexible material allows the duct to expand and contract in accordance with the length of the bridge. However, the air pressures which can be used with such a device are necessarily quite low, in the range of inches of water rather than pounds per square inch. Thus, such a system would be ineffective for supplying the aircraft with a supply of air power at pressures and in amounts sufficient to start the engines so that the APU must still be used during engine start-up.

One method for supplying air at pressures and in amounts sufficient to start the engines is to pull medium pressure, flexible hose from the terminal to the aircraft, however, these hoses are heavy, awkward to manipulate, and obstruct the area around the aircraft. Another method is to construct underground pressurized air conduits to the aircraft waiting area. Flexible hoses from normally covered access holes are connected to the aircraft so the APU need not be used. However, these underground systems are expensive to install and once in place restrict the areas at which aircraft can be parked.

Therefore, what is missing in the prior art is an inexpensive, operationally flexible system to supply waiting aircraft with air at pressures and in amounts sufficient to satisfy the power needs of the aircraft, such as air conditioning and engine start up, to eliminate the need to use the APU on the aircraft.

SUMMARY OF THE INVENTION

A telescoping conduit for directing air at moderate pressures, for example, 20-45 psig (pounds per square inch guage), and at relatively high rates of flow, for example, 1,500 to 5,000 CFM (cubic feet per minute), from a stationary pressurized air source at the terminal area to a waiting aircraft along a telescoping bridge is disclosed. The telescoping conduit includes a number of telescoping tubes suspended beneath the segments of a telescoping bridge. The tubes are coaxially supported below the walkway of the telescoping bridge by adjustable brackets. One telescoping tube is mounted to each segment of the telescoping bridge. One tube, for example, the tube adjacent to the aircraft, is suspended from its associated telescoping bridge segment at both ends, while the remainder of the tubes are suspended from a single end. This means of suspension allows the tubes to telescopically extend and retract, or nest, to a maximum degree while providing support for the tubes at each end. The tubes are sealed typically using an O-ring or O-rings at one end of each tube. The sealing portion of the tube, around which the O-rings are seated, is made of a somewhat flexible material which acts as a bearing and accommodates slight misalignment of the tubes to prevent air leaks. A roller cage acts to center the nesting tubes so that a wiper seal between the tubes does not become permanently deformed.

The apparatus of the present invention allows a waiting aircraft to be supplied pressurized air at moderate pressures and at high volumes so that the APU does not have to be used. Therefore, the air and noise pollution caused by the APU is eliminated and the efficiency of supplying power to the aircraft is increased.

Using the telescoping bridge to support the pressurized air conduit, which supplies the waiting aircraft with pressurized air, eliminates several problems associated with the prior art. Both air start and air conditioning trucks are eliminated. This reduces hose handling, vehicle handling and attendant hazards to both aircraft and personnel working in the area. Furthermore, expensive, permanently located underground supply routes for pressurized air are not needed. Therefore, cost is reduced and flexibility for positioning waiting aircraft is increased compared with underground supply systems.

The telescoping conduit disclosed is rather straightforward in design and is relatively easy to install and maintain. The provision of a resilient sealing member at one end of the telescoping tubes provides a good seal between the tubes and yet allows for some axial misalignment of the tubes. The brackets supporting the tubes along the walkway are easily adjustable so that the tubes may be coaxially aligned for proper operation.

Other features and advantages of the present invention will become apparent from the following description in which the preferred embodiment is set forth in detail in conjunction with the accompanying drawings.

BRIEF DESCRIPTION OF THE DRAWINGS

FIG. 1 is a side view of the telescoping conduit shown suspended from a telescoping bridge in its fully extended position.

FIG. 2 shows the conduit and bridge of FIG. 1 in its fully retracted position.

FIG. 3 is an exploded side view of a suspension bracket supporting the telescoping tubes.

FIG. 4 is the sectional view taken along lines 4—4 of FIG. 3 and illustrating the adjustable tube clamps which surround the telescoping tubes.

FIG. 5 is a sectional view taken along line 5—5 of FIG. 3 illustrating the concave rollers which surround the telescoping tubes.

FIG. 6 is an enlarged side sectional view of the telescoping tube illustrating the wiper seal.

DETAILED DESCRIPTION OF THE PREFERRED EMBODIMENT

Turning our attention to the figures, the telescoping conduit 2 of the invention comprises generally a number of telescoping tubes 3, 5, 7 suspended from the walkway 6 of the bridge segments 9, 11, 13 via suspension brackets 10. A roller cage 60 centers the nesting tubes so that they remain concentric at the wiper seal 62.

In FIG. 1 telescoping conduit 2 and telescoping bridge 12 are shown fully extended. A first end 14 of the bridge, supported by a column 16, is fixed in place adjacent a doorway D in the terminal T. A second or outer end 18 is supported above ground G by a wheeled support structure or pedestal 20.

The telescoping bridge is therefore extendible to reach the door of a waiting aircraft (not shown). First end 14 of telescoping bridge 12 is pivotally supported by column 16 so that outer end 18 can be directed to the door of the aircraft. In order to accommodate the pivoting of the bridge about column 16, a flexible segment 22 is provided between door D and first end 14. Outer end 18 typically has a flexible portion, not shown, for confronting the fuselage of the aircraft surrounding the doorway. A flexible connecting hose 23 fluidly connects the outer end 26 of tube 7 with the aircraft.

Turning now to FIGS. 3-6 the means for suspending telescoping tubes 3, 5, 7 below walkway 6 and the manner of sealing the tubes will be described. Tube 7 has a first end 24 and tube 5 has a second end 26. Second end 26 is sized to fit within adjacent first end 24 of tube 7. The second end has a slightly enlarged resilient piston portion 30 for slidable engagement within tube 7. A circumferential groove is formed within the outside of outer portion 30 and carries an O-ring 32 for sealing tubes 5 and 7. If desired additional O-rings, or other suitable sealing means, can be used to increase the sealing effectiveness. It should be noted that a gap 34 is left between the outside diameter of tube 5 and the inside diameter of tube 7. Because, however, outer portion 30 is somewhat flexible, binding between the tubes is inhibited and the seal between tubes 5 and 7 is not lost. The seal between tubes 3 and 5 is of similar construction.

To prevent debris from entering the interior of tube 7, a first end 24 is provided with wiper seal 62, seen best at FIG. 6. Seal 62 is secured to end 24 by a retainer ring 64. Roller cage 60, as shown in FIG. 5, insures that tubes 5 and 7 are generally concentric at the wiper seal. Cage 60 includes four concave rollers 66 which surround tube 5 and keep it from pressing with too much force against the wiper seal. Permanent deformation of the seal is therefore prevented. First end 68 of tube 5 is of like construction.

The tubes are shown suspended below walkway 6 by suspension bracket assemblies 10. Each assembly 10 includes a U-bolt 36 mounted to the floor 38 of the walkway 6. A pair of tube clamps 40 engage the legs 42 of the U-bolt and allow the tubes to be adjustably positioned beneath floor 38. Each tube clamp has a longitudinal slot 44 at one end and a transverse slot 46 at the other. Typically, a tube clamp is mounted to the legs by placing one leg 42 within longitudinal slot 44 and then rotating clamp 40 until slot 46 engages the other leg of U-bolt 36. The vertical position of the tubes can be adjusted by manipulation of nuts 48, 50. It is preferred that the tubes be adjustably mounted to the bridge. If desired, however, the mounting means used could be essentially non-adjustable if the user so desires, as when the accuracy of the installation can be sufficiently controlled.

In the disclosed embodiment telescoping bridge 12 includes three bridge segments 9, 11, and 13, and telescoping tubes 3, 5, and 7. Since it is desirable that the mounting means be rigidly affixed to the walkway for the sake of simplicity, the tube mounting means are located at the end of the bridge segment which surrounds the adjacent bridge segment. In the disclosed embodiment assemblies 10 attach to tube 7 adjacent tube 5 and tube 5 adjacent tube 3. The bracket assembly 10 supports the tubes and does not interfere with the retraction of the bridge or the tubes. Thus, the maximum support with the minimum interference is achieved.

Modification and variation may be made in the disclosed embodiment, such as mounting the tubes along the side of or on top of the bridge, without departing from the subject of the invention as defined in the following claims.

What is claimed is:

1. Apparatus for supplying pressurized air to waiting aircraft along a telescoping walkway having a predetermined number of telescoping walkway segments, comprising:

a plurality of telescoping tubes having first and second ends;

means for mounting one said tube along the length of each of said telescoping segments, said mounting means adapted to mount said tubes for telescoping, coaxial engagement with one another, the first end of one tube engaging and surrounding the second end of the adjacent tube, so that as as said walkway segments are telescoped and retracted, said tubes are telescoped and retracted therewith; and means for continuously fluidly sealing said mounted telescoping tubes irrespective of the relative telescopic positions thereof so that the pressurized air can be passed through said telescoping coaxially engaged tubes to provide the pressurized air at a desired pressure and at a desired rate of flow to the aircraft thereby providing an auxiliary source of air power for the aircraft.

2. The apparatus of claim 1 wherein there is at least a first tube at a first end of the walkway and a second tube at a second end of the walkway, said mounting means attached near said first and second ends of said second tube and near said first end of said first and any intermediate tubes.

3. The apparatus of claim 1 wherein said telescoping walkway is a part of a telescoping bridge.

4. The apparatus of claim 1 wherein said mounting means suspend said tubes below said walkway.

5. The apparatus of claim 4 wherein said mounting means are adjustable to assure the proper coaxial alignment of said suspended tubes.

6. The apparatus of claim 1 wherein said desired pressure is about 20 to 45 psig.

7. The apparatus of claim 1 wherein said desired rate of flow is about 1500 to 5,000 cfm.

8. The apparatus of claim 1 further comprising rotational engagement means attached to said first end of a tube for centering said adjacent tube therein.

9. The apparatus of claim 8 wherein said rotational engagement means includes a roller cage having a plurality of rollers which engage the outer surface of said adjacent tube.

10. The apparatus of claim 1 wherein said tubes are cylindrical and include a flexible sealing portion having an O-ring mounted around said flexible sealing portion for sealable engagement between said first and second ends of adjacent tubes.

11. The apparatus of claim 1 wherein said first end of a tube includes a wiper seal for contacting the outer surface of the adjacent tube.

12. The apparatus of claim 1 wherein said sealing means comprises a flexible extension member mounted to said second end to inhibit binding between engaged tubes.

13. The apparatus of claim 12 wherein said flexible extension member has a transverse dimension larger than the transverse dimension of said second end from which said extension member extends.

14. In combination with a telescoping bridge having a number of telescoping bridge segments, apparatus for supplying pressurized air to a waiting aircraft via said bridge comprising:

a plurality of tubes each having first and second ends;

means for mounting a tube to each bridge segment in coaxial, telescoping engagement with the first end of one tube engaging and surrounding the second end of the adjacent tube;

said mounting means coupling the first ends of each of said tubes to its respective bridge segment and coupling the second end of a tube at one end of said bridge to its respective bridge segment;

means attached to said first end of a tube for centering the adjacent tube therein; and means for fluidly sealing said telescopically engaged tubes to that pressurized air can be passed through said tubes to the waiting aircraft, said sealing means including a flexible extension member extending from said second end of at least one of said tubes to accommodate axial misalignment of said tubes while not sacrificing sealing effectiveness.

* * * * *

UNITED STATES PATENT AND TRADEMARK OFFICE
CERTIFICATE OF CORRECTION

PATENT NO. : 4,357,860
DATED : Nov. 9, 1982
INVENTOR(S) : David W. Krzak

It is certified that error appears in the above-identified patent and that said Letters Patent is hereby corrected as shown below:

Claim 14, at column 6, line 15 should read:

tubes so that pressurized air can be passed through

Signed and Sealed this

Fifteenth Day of February 1983

[SEAL]

Attest:

GERALD J. MOSSINGHOFF

Attesting Officer

Commissioner of Patents and Trademarks